United States Patent
Movsichoff

(10) Patent No.: US 10,473,088 B2
(45) Date of Patent: Nov. 12, 2019

(54) SYSTEM AND METHOD FOR VARIABLE TIP-SPEED-RATIO CONTROL OF A WIND TURBINE

(71) Applicant: General Electric Company, Schenectady, NY (US)

(72) Inventor: Bernardo Adrian Movsichoff, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 310 days.

(21) Appl. No.: 14/656,870

(22) Filed: Mar. 13, 2015

(65) Prior Publication Data
US 2016/0265509 A1  Sep. 15, 2016

(51) Int. Cl.
*F03D 7/02* (2006.01)
*F03D 7/04* (2006.01)
*F03D 1/06* (2006.01)

(52) U.S. Cl.
CPC ............ *F03D 7/0224* (2013.01); *F03D 1/06* (2013.01); *F03D 7/028* (2013.01); *F03D 7/0276* (2013.01); *F03D 7/047* (2013.01); *F05B 2270/1016* (2013.01); *F05B 2270/335* (2013.01); *Y02E 10/721* (2013.01); *Y02E 10/723* (2013.01); *Y02E 10/725* (2013.01)

(58) Field of Classification Search
CPC .......... F03D 1/06; F03D 7/0224; F03D 7/026; F03D 7/0276; F03D 7/028; F03D 7/046; F03D 7/047; F05B 2260/71; F05B 2270/1016; F05B 2270/1032; F05B 2270/1033; F05B 2270/335
See application file for complete search history.

(56) References Cited

U.S. PATENT DOCUMENTS 4,703,189 A * 10/1987 DiValentin ............ F03D 7/0224
290/44
5,155,375 A  10/1992 Holly
(Continued)

FOREIGN PATENT DOCUMENTS

CN   101520027 A   9/2009
CN   102900611 A   1/2013
(Continued)

OTHER PUBLICATIONS

Wind turbine aerodynamics, Wikipedia, http://en.wikipedia/wiki/Wind_turbine_aerodynamics.
(Continued)

*Primary Examiner* — Carlos A Rivera
*Assistant Examiner* — Alexander A White
(74) *Attorney, Agent, or Firm* — Dority & Manning, P.A.

(57) ABSTRACT

The present subject matter is directed to a system and method for operating a wind turbine so as to increase power production by utilizing variable tip-speed-ratio control. In one embodiment, the method includes defining a first operating region associated with an unsaturated torque range and a second operating region associated with a saturated torque range. Further, the method includes monitoring a torque output of the wind turbine. The method also includes continuously adjusting a tip-speed-ratio set point of the wind turbine so as to operate the wind turbine along a torque constraint boundary of the first and second operating regions.

14 Claims, 13 Drawing Sheets

(56) References Cited

U.S. PATENT DOCUMENTS

| | | | |
|---|---|---|---|
| 5,798,631 | A | 8/1998 | Spee et al. |
| 7,261,672 | B2 | 8/2007 | Frank et al. |
| 7,504,738 | B2 | 3/2009 | Barton et al. |
| 7,586,206 | B2 | 9/2009 | Barton et al. |
| 7,602,075 | B2 | 10/2009 | Erdman et al. |
| 7,704,043 | B2 | 4/2010 | Kabatzke et al. |
| 8,803,352 | B1 | 8/2014 | Koerber et al. |
| 2004/0197186 | A1* | 10/2004 | Wobben .................. F03D 7/046 415/1 |
| 2007/0085343 | A1 | 4/2007 | Fortmann |
| 2008/0069693 | A1 | 3/2008 | Malakhova et al. |
| 2009/0220340 | A1 | 9/2009 | Pierce et al. |
| 2009/0295159 | A1 | 12/2009 | Johnson et al. |
| 2010/0098540 | A1* | 4/2010 | Fric ...................... F03D 7/0224 416/36 |

FOREIGN PATENT DOCUMENTS

| | | | |
|---|---|---|---|
| CN | 103244350 | A | 8/2013 |
| EP | 0023729 | A1 | 5/1987 |
| EP | 2 541 050 | A2 | 1/2013 |
| EP | 2 669 513 | A2 | 12/2013 |

OTHER PUBLICATIONS

"Wind Turbine Power Calculations", The Royal Academy of Engineering, pp. 1-5.
"Understanding Coefficient of Power (Cp) and Betz Limit" Kidwind Science Snak: Betz Limit.
Pao et al., "A Tutorial on the Dynamics and Control of Wind Turbines and Wind Farms", Jun. 12, 2009, American Control Conference, p. 2082.
Co-Pending U.S. Appl. No. 13/106,007, filed May 12, 2011.
Beltran et al., "High-Order Sliding-Mode Control of Variable-Speed Wind Turbines", IEEE Transactions on Industrial Electronics, vol. No. 52, Issue No. 9, pp. 3314-3321, Sep. 1, 2009.
European Search Report & Opinion issued in connection with corresponding EP Application No. 16159952.7 dated Aug. 1, 2016.
Machine translation and First Office Action and Search issued in connection with corresponding CN Application No. 201610404031.2 dated Oct. 22, 2018.

* cited by examiner

SYSTEM AND METHOD FOR VARIABLE TIP-SPEED-RATIO CONTROL OF A WIND TURBINE

FIELD OF THE INVENTION

The present invention relates generally to wind turbines, and more particularly, to a system and method for variable tip-speed-ratio control of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and a blade root of the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

A plurality of wind turbines are commonly used in conjunction with one another to generate electricity and are commonly referred to as a "wind farm." Wind turbines on a wind farm typically include their own meteorological sensors that perform, for example, temperature, wind speed, wind direction, barometric pressure, and/or air density measurements. In addition, a separate meteorological mast or tower ("met mast") having higher quality meteorological instruments that can provide more accurate measurements at one point in the farm is commonly provided. The correlation of meteorological data with power output allows the empirical determination of a "power curve" for the individual wind turbines.

For example, FIG. 1 illustrates a typical operating power curve 100 for a wind turbine. As shown, a typical wind turbine operates along an operating line 102 from a point "1" where wind speed is zero through points 2-3-4-5 (also known as the variable wind speed or knee region) to reach a rated power level 104 at point "5." After reaching the rated power level 104, additional wind speed does not result in additional turbine power output.

Generally, it is important to optimize the operation of the wind turbine, including blade energy capture, to reduce the cost of the energy produced. To this end, each turbine includes a control module, which attempts to maximize power output of the turbine in the face of varying wind and grid conditions, while satisfying constraints like sub-system ratings and component loads. Wind turbine loads are dependent on the wind speed, tip speed ratio (TSR), and/or pitch setting of the blade. TSR, as is understood by those of ordinary skill in the art, is the ratio of the tangential velocity of the blade tip to the actual wind speed. Pitch settings of the blades (i.e., the angle of attack of the airfoil shaped blade), provides one of the parameters utilized in wind turbine control. Based on the determined maximum power output, the control module controls the operation of various turbine components, such as the generator/power converter, the pitch system, the brakes, and the yaw mechanism to reach the maximum power efficiency.

For example, wind turbine controllers are configured to adjust the rotational speed of the hub around which the blades rotate, i.e., the rotational speed, by adjusting the blade pitch in a manner that provides increased or decreased energy transfer from the wind, which accordingly is expected to adjust the rotor speed. As such, wind turbines are typically designed for a rated wind speed at which maximum thrust and maximum power generation occur.

Generally, the farm controller sends a fixed TSR command to each of the turbines in the wind farm to control rotor speed. As shown in FIG. 2, a relationship exists between rotor speed and torque as illustrated by torque-speed curve 200. The torque-speed curve 200 illustrates differing operating curves where curve 202 extending along points 1-2-5-6 represents a low torque demand design while curve 204 extending along points 1-3-4-5-6 represents a high torque demand design. As shown, the low torque demand curve 202 will reach a rated rotor speed 206 at point "2" where speed clipping will be observed prior to such turbine reaching its rated power at point "6." The high torque demand curve 204, on the other hand, will reach its rated torque at point "4" (i.e. the point of torque saturation) and experience torque clipping prior to reaching its rated power at point "5." Thus, some wind turbines experience a loss of power in the variable wind speed region due to torque saturation occurring earlier than the maximum rotor speed.

Accordingly, improved systems and methods for controlling wind turbines that address the aforementioned issues are desired in the art. In particular, systems and methods for controlling wind turbines using variable tip-speed-ratio control would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for operating a wind turbine so as to increase power production of a wind turbine. The method includes defining a first operating region associated with an unsaturated torque range and a second operating region associated with a saturated torque range. Further, the first and second torque ranges are different. The method also includes continuously adjusting a tip-speed-ratio set point of the wind turbine so as to operate the wind turbine along a torque constraint boundary of the first and second operating regions.

In one embodiment, the step of continuously adjusting the tip-speed-ratio set point of the wind turbine further includes increasing the tip-speed-ratio set point when the torque output of the wind turbine is within the second operating region. Similarly, the step of continuously adjusting the tip-speed-ratio set point of the wind turbine may also include decreasing the tip-speed-ratio set point when the torque output of the wind turbine is within the first operating region.

In another embodiment, the method may also include determining the torque constraint boundary of the first and second operating regions based upon when the wind turbine switches operating modes. For example, in certain embodiments, switching operating modes may include pitching one or more rotor blades of the wind turbine.

In further embodiments, the saturated torque range occurs when a torque of the wind turbine reaches a rated torque.

In additional embodiments, the saturated torque range may include torque values less than the torque constraint boundary of the wind turbine, whereas the unsaturated torque range may include torque values equal to or greater than the torque constraint boundary of the wind turbine. In further embodiments, the step of continuously adjusting the tip-speed-ratio set point of the wind turbine occurs in a variable wind speed region of a power curve of the wind turbine.

In another embodiment, the method may also include filtering (e.g. via a filter or otherwise) the tip-speed-ratio set point. In further embodiments, the step of continuously adjusting the tip-speed-ratio set point of the wind turbine may include utilizing sliding-mode control.

In another aspect, the present disclosure may be directed to a system for increasing power production of a wind turbine. The system includes one or more sensors configured to monitor a torque output of the wind turbine and a controller communicatively coupled to a processor. Further, the processor is configured to perform one or more operations. The operations includes defining a first operating region associated with an unsaturated torque range, defining a second operating region associated with a saturated torque range, and continuously adjusting a tip-speed-ratio set point of the wind turbine so as to operate the wind turbine along a torque constraint boundary of the first and second operating regions, e.g. in the variable wind speed region of the power curve.

In yet another aspect, the present disclosure is directed to a method for operating a wind turbine based on a variable tip-speed-ratio. The method includes determining, via a processor, an initial tip-speed-ratio set point for the wind turbine. Another step includes monitoring, via one or more sensors, a torque output of the wind turbine. The method also includes continuously adjusting the tip-speed-ratio set point of the wind turbine based the torque output so as to maximize a power output of the wind turbine.

In one embodiment, the step of monitoring the torque output of the wind turbine may include monitoring the torque output during a first operating region associated with an unsaturated torque range and monitoring the torque output during a second operating region associated with a saturated torque range. As such, in further embodiments, the step of continuously adjusting the tip-speed-ratio set point of the wind turbine based the torque output may include continuously adjusting the tip-speed-ratio set point so as to operate the wind turbine along a torque constraint boundary of the first and second operating regions. It should be understood that the method may also include any of the additional steps and/or features described herein.

These and other features, aspects and advantages of the present invention will become better understood with reference the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
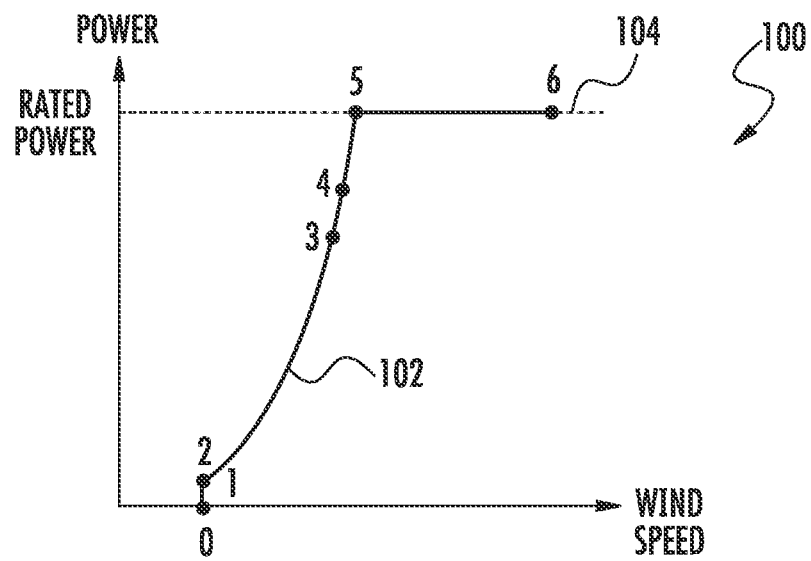
FIG. 1 illustrates a typical operating power curve for a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for operating a wind turbine so as to increase power production by utilizing variable tip-speed-ratio control. Typically, a wind turbine controller uses a fixed tip-speed-ratio (TSR) target to compute the desired speed of the turbine. In some instances, however, a turbine may reach torque saturation before speed saturation and hence start pitching to control the speed. In this way, the wind turbine may lose power in the variable wind-speed region of the power curve. In addition, for some wake control schemes, the controller may receive an external TSR target lower than the TSR for normal operation. The lower TSR leads to even earlier pitching activity and loss of power (and may also lead to previously non-existing early torque saturation).

Accordingly, the wind turbine controller of the present disclosure is configured to ignore an external TSR target and maintain the normal TSR target when reaching this torque saturation area. Furthermore, the controller of the present disclosure addresses any instances of early pitching activity due to torque-before-speed saturation when using the normal and fixed TSR target by allowing the TSR target to increase to above normal values when torque saturation is reached. For example, in one embodiment, the controller defines first and second operation regions with each region being associated with saturated and unsaturated torque ranges. As such, the controller is configured to operate the wind turbine along a torque constraint boundary of the first and second operation regions by continuously adjusting a tip-speed-ratio set point of the wind turbine.

The various embodiments of the system and method described herein provide numerous advantages not present in the prior art. For example, as mentioned, the present disclosure provides improved power production in the variable wind speed region of the power curve. As such, wind farms and/or wind turbines operated according to the present disclosure provide an overall increase in annual energy production (AEP) when compared to prior art systems.

Figure 3:
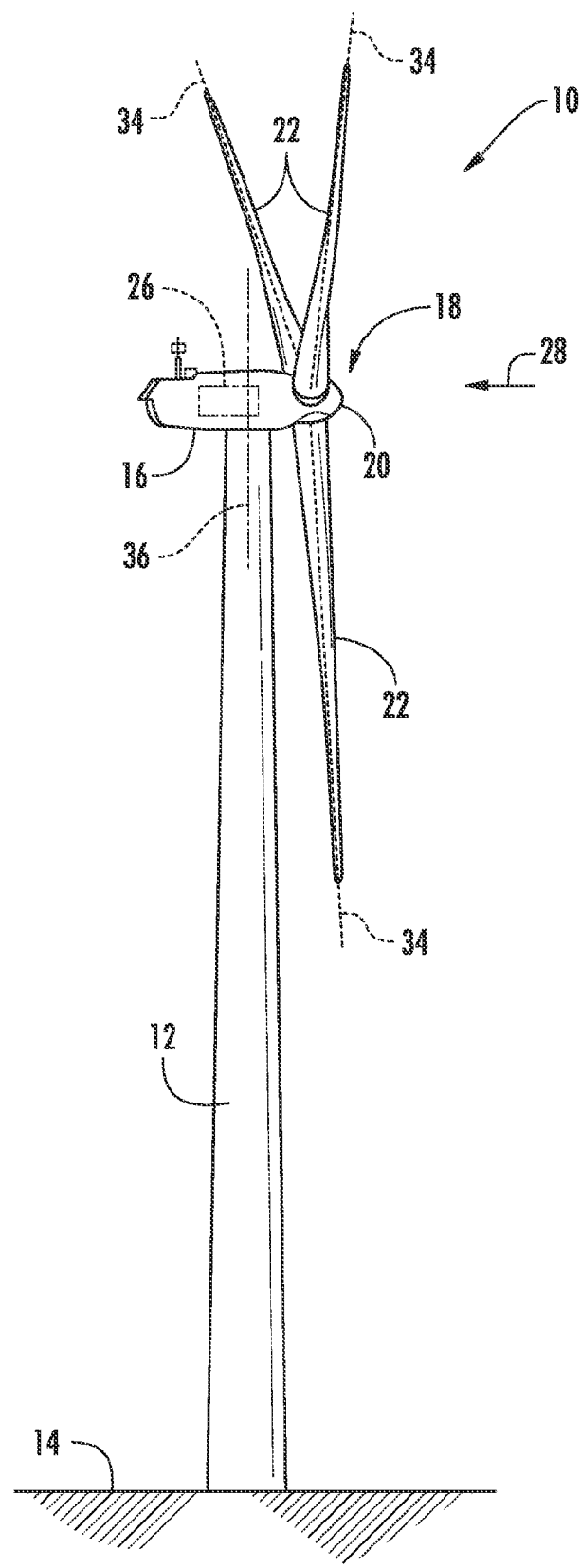
FIG. 3 is a perspective view of a wind turbine according to one embodiment of the present disclosure.

Referring now to the drawings, FIG. 3 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 4) positioned within the nacelle 16 to permit electrical energy to be produced.

Figure 4:
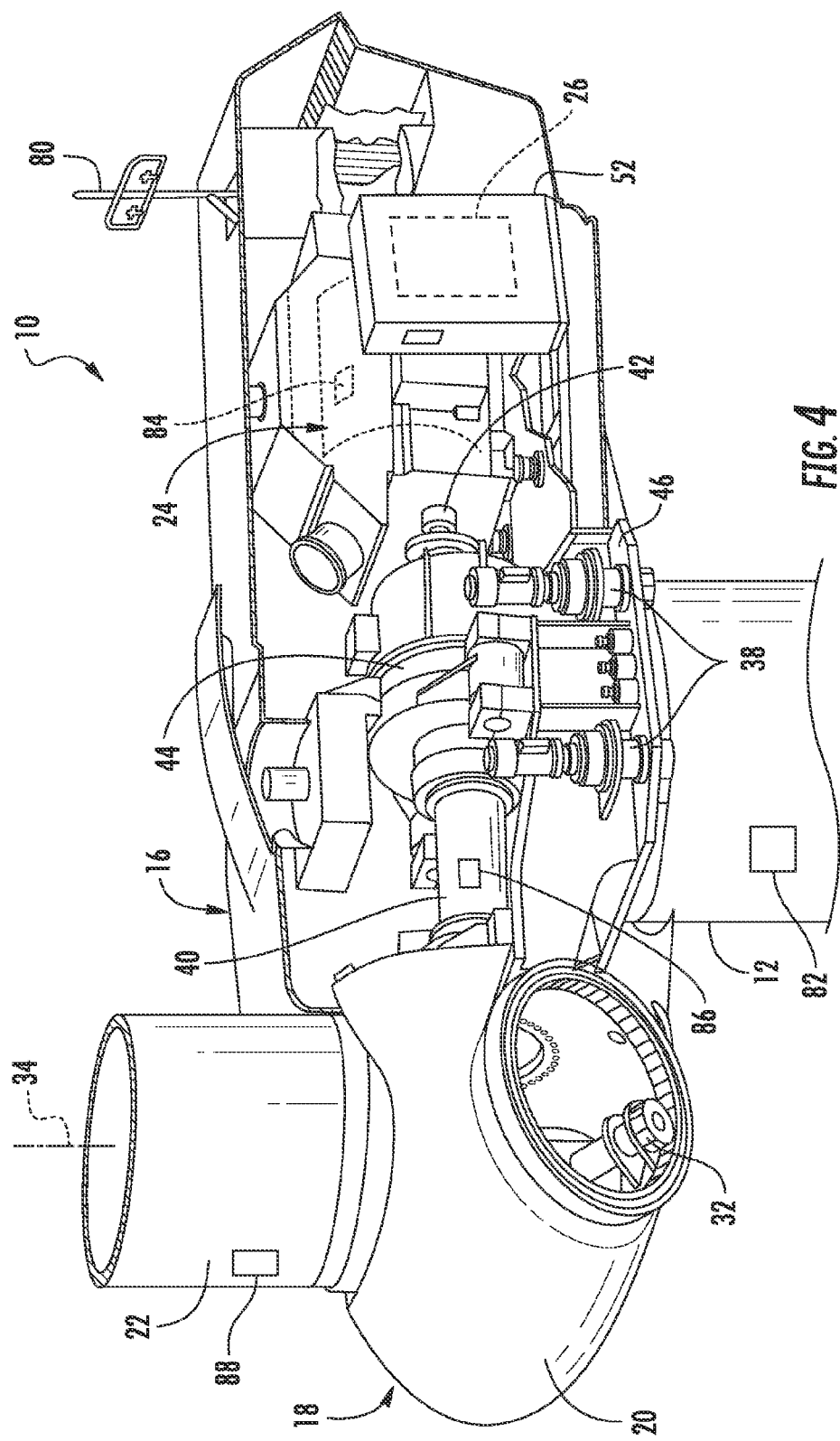
FIG. 4 illustrates a perspective, internal view of a nacelle of a wind turbine according to one embodiment of the present disclosure.

Referring now to FIG. 4, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a main rotor shaft 40 coupled to the hub 20 for rotation therewith. The generator 24 may then be coupled to the rotor shaft 40 such that rotation of the rotor shaft 40 drives the generator 24. For instance, in the illustrated embodiment, the generator 24 includes a generator shaft 42 rotatably coupled to the rotor shaft 40 through a gearbox 44. However, in other embodiments, it should be appreciated that the generator shaft 42 may be rotatably coupled directly to the rotor shaft 40. Alternatively, the generator 24 may be directly rotatably coupled to the rotor shaft 40 (often referred to as a "direct-drive wind turbine"). It should be appreciated that the rotor shaft 40 may generally be supported within the nacelle by a support frame or bedplate 46 positioned atop the wind turbine tower 12.

As shown in FIGS. 3 and 4, the wind turbine 10 may also include a turbine control system or a turbine controller 26 centralized within the nacelle 16. For example, as shown, the turbine controller 26 is disposed within a control cabinet 52 mounted to a portion of the nacelle 16. However, it should be appreciated that the turbine controller 26 may be disposed at any location on or in the wind turbine 10, at any location on the support surface 14 or generally at any other location.

The turbine controller 26 may generally be configured to control the various operating modes (e.g., start-up or shut-down sequences) and/or components of the wind turbine 10. For example, the controller 26 may be configured to control the blade pitch or pitch angle of each of the rotor blades 22 (i.e., an angle that determines a perspective of the rotor blades 22 with respect to the direction 28 of the wind) to ultimately control power output of the wind turbine 10. More specifically, the controller 26 may control the pitch angle of the rotor blades 22, either individually or simultaneously, by transmitting suitable control signals/commands to various pitch drives or pitch adjustment mechanisms 32 (FIG. 4) of the wind turbine 10. Specifically, the rotor blades 22 may be rotatably mounted to the hub 20 by one or more pitch bearing(s) (not illustrated) such that the pitch angle may be adjusted by rotating the rotor blades 22 about their pitch axes 34 using the pitch adjustment mechanisms 32. The controller 26 may also be communicatively coupled to the yaw drive mechanism(s) 38 of the wind turbine 10 for controlling and/or altering the yaw direction of the nacelle 16 relative to the direction 28 (FIG. 3) of the wind.

Still further, the turbine controller 26 may be configured to control the torque of the generator 24. For example, the controller 26 may be configured to transmit control signals/commands to the generator 24 in order to modulate the magnetic flux produced within the generator 24, thus adjusting the torque demand on the generator 24. It should additionally be understood that the controller 26 may be a singular controller or include various components, such as pitch controllers and/or yaw controllers, which communicate with a central controller for specifically controlling pitch and yaw as discussed.

Figure 5:
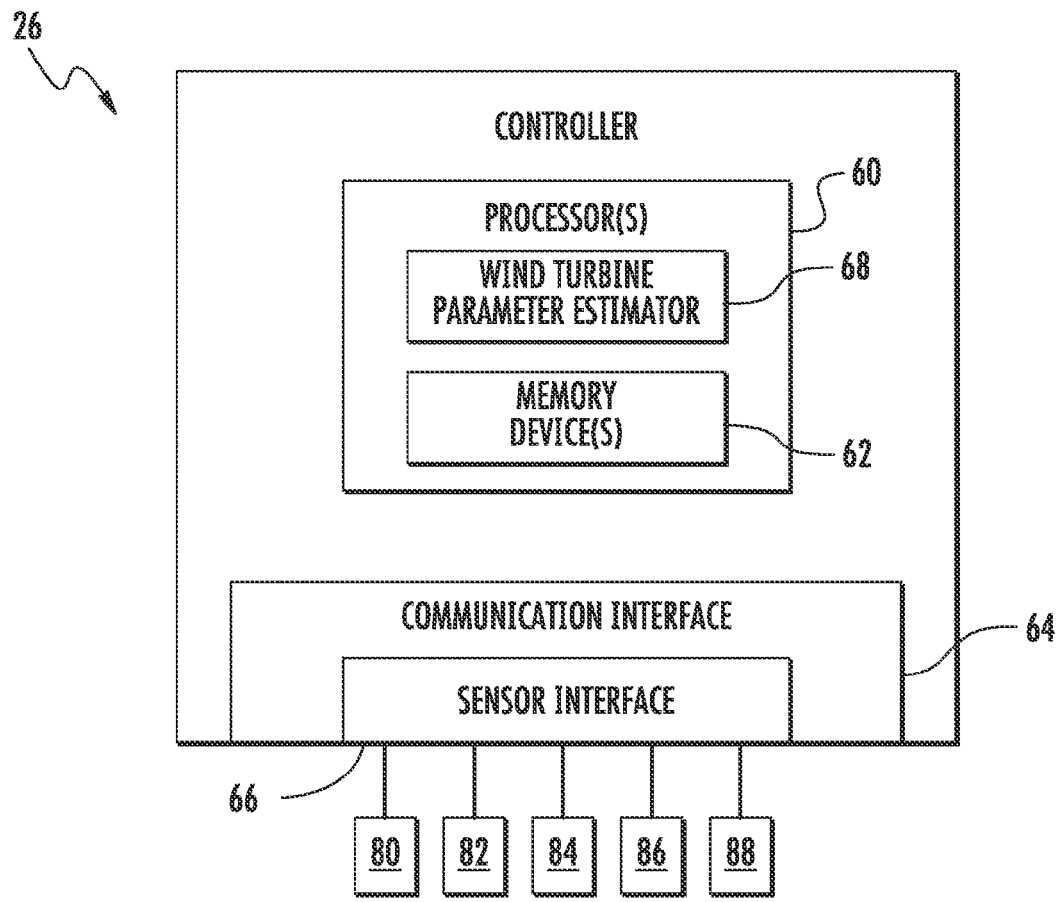
FIG. 5 illustrates a schematic diagram of one embodiment of suitable components that may be included within a controller of a wind turbine according to the present disclosure.

Referring now to FIG. 5, there is illustrated a block diagram of one embodiment of suitable components that may be included within the turbine controller 26 in accordance with aspects of the present subject matter. As shown, the controller 26 may include one or more processor(s) 60 containing a wind turbine parameter estimator 68 and/or associated memory device(s) 62 configured to perform a variety of computer-implemented functions (e.g., performing the methods, steps, calculations and the like disclosed herein). Additionally, the controller 26 may also include a communications module 64 to facilitate communications between the controller 26 and the various components of the wind turbine 10. For instance, the communications module 64 may serve as an interface to permit the turbine controller 26 to transmit control signals to each pitch adjustment mechanism 32 for controlling the pitch angle of the rotor blades 22. Moreover, the communications module 64 may include a sensor interface 66 (e.g., one or more analog-to-digital converters) to permit input signals transmitted from, for example, various sensors 80, 82, 84, 86, 88 of the wind turbine 10, to be converted into signals that can be understood and processed by the processors 60. It should be appreciated that the sensors 80, 82, 84, 86, 88 may be communicatively coupled to the communications module 64 using any suitable means. For example, as shown in FIG. 5, the sensors 80, 82, 84, 86, 88 are coupled to the sensor interface 66 via a wired connection. However, in other embodiments, the sensors 80, 82, 84, 86, 88 may be coupled to the sensor interface 66 via a wireless connection, such as by using any suitable wireless communications protocol known in the art.

In certain embodiments, the wind turbine parameter estimator 68 is configured to receive the signals from one or more sensors 80, 82, 84, 86, 88 that are representative of various operating conditions of the wind turbine 10. The operating conditions may consist of any combination of the following: a wind speed, a pitch angle, a generator speed, a power output, a torque output, a temperature, a pressure, a tip speed ratio, an air density, a rotor speed, a power coefficient, a torque coefficient, a thrust coefficient, a thrust, a thrust response, a blade bending moment, a shaft bending moment, a tower bending moment, a speed response, or similar. Further, the wind turbine parameter estimator 68 may be considered software that utilizes the operating conditions to calculate, in real-time, various parameters of the wind turbine 10. In addition, the wind turbine parameter estimator 68 may include firmware that includes the software, which may be executed by the processor 60.

Accordingly, in one embodiment, the wind turbine parameter estimator 68 is configured to implement a control algorithm having a series of equations to determine various parameters. As such, the equations are solved using the one or more operating conditions, one or more aerodynamic performance maps, one or more look-up tables (LUTs), or any combination thereof. In one embodiment, for example, the aerodynamic performance maps are dimensional or non-dimensional tables that describe rotor loading and performance (e.g. power, thrust, torque, or bending moment, or similar) under given conditions (e.g. density, wind speed, rotor speed, pitch angles, or similar). As such, the aerodynamic performance maps may include: a power coefficient, a thrust coefficient, a torque coefficient, and/or partial derivatives with respect to pitch angle, rotor speed, or tip speed ratio. Alternatively, the aerodynamic performance maps can be dimensional power, thrust, and/or torque values instead of coefficients. In various embodiments, the LUTs may include: aerodynamic performance parameters, blade bending load, tower bending load, shaft bending load, or any other turbine component load.

As used herein, the term "processor" refers not only to integrated circuits referred to in the art as being included in a computer, but also refers to a controller, a microcontroller, a microcomputer, a programmable logic controller (PLC), an application specific integrated circuit, a graphics processing unit (GPUs), and/or other programmable circuits now known or later developed. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26 to perform various functions as described herein.

Referring back to FIG. 4, the sensors 80, 82, 84, 86, 88 as described herein may include blade sensors 88, e.g. for measuring a pitch angle of one of the rotor blades 22; generator sensors 84 for monitoring the generator 24 (e.g. torque, speed, acceleration and/or the power output); shaft sensors 86, e.g. for measuring rotor speed; tower sensors 82; and/or various wind sensors 80 for measuring various wind parameters, such as wind speed, wind peaks, wind turbulence, wind shear, changes in wind direction, air density, or similar. Further, the sensors 80, 82, 84, 86, 88 may be located near the ground of the wind turbine 10, on the nacelle 16, or on a meteorological mast of the wind turbine 10. Moreover, it should also be understood that any other number or type of sensors may be employed and at any location. For example, the sensors may be Micro Inertial Measurement Units (MIMUs), strain gauges, accelerometers, pressure sensors, angle of attack sensors, vibration sensors, Light Detecting and Ranging (LIDAR) sensors, camera systems, fiber optic systems, anemometers, wind vanes, barometers, Sonic Detection and Ranging (SODAR) sensors, infra lasers, radiometers, pitot tubes, rawinsondes, other optical sensors, and/or any other suitable sensors.

It should be appreciated that, as used herein, the term "monitor" and variations thereof indicates that the various sensors 80, 82, 84, 86, 88 may be configured to provide a direct measurement of the parameters being monitored or an indirect measurement of such parameters. Thus, the sensors 80, 82, 84, 86, 88 may, for example, be used to generate signals relating to the parameter being monitored, which can then be utilized by the controller 26 to determine the actual parameter.

Figure 6:
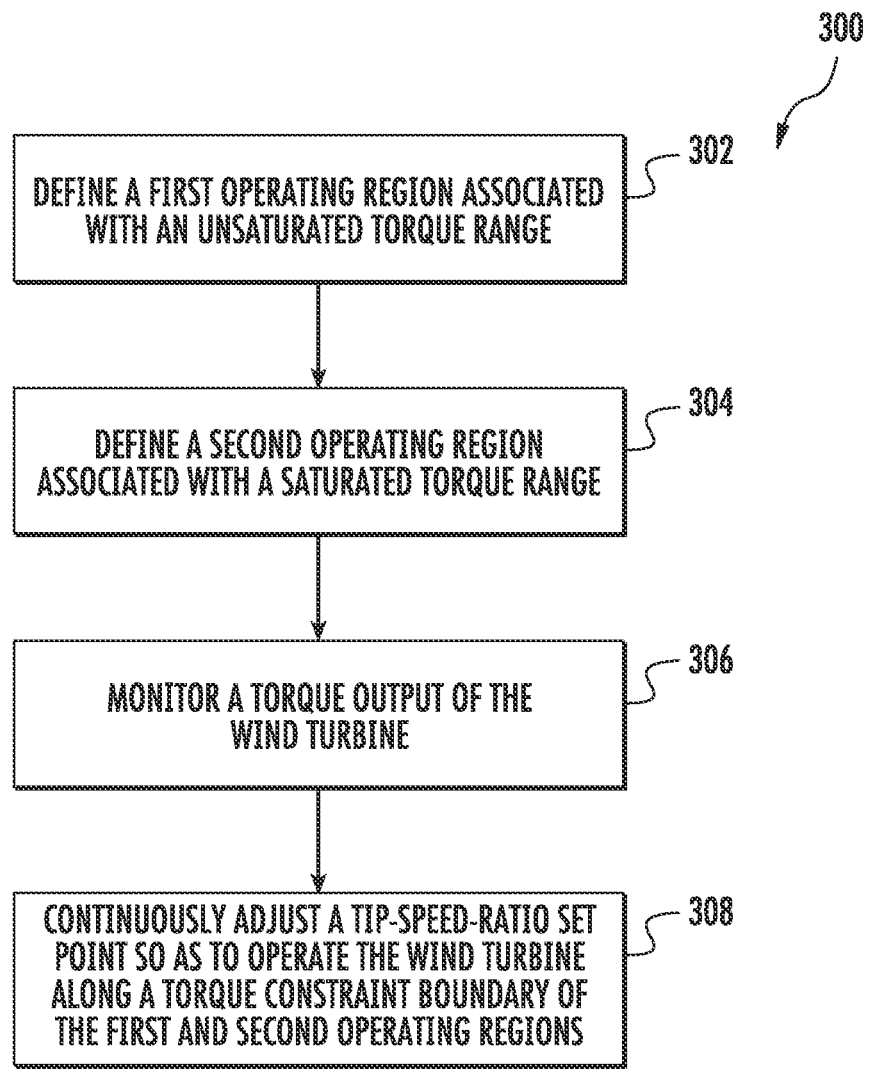
FIG. 6 illustrates a flow diagram of one embodiment of a method for increasing power production of a wind turbine in the variable wind speed region of the power curve according to the present disclosure.
Figure 7:
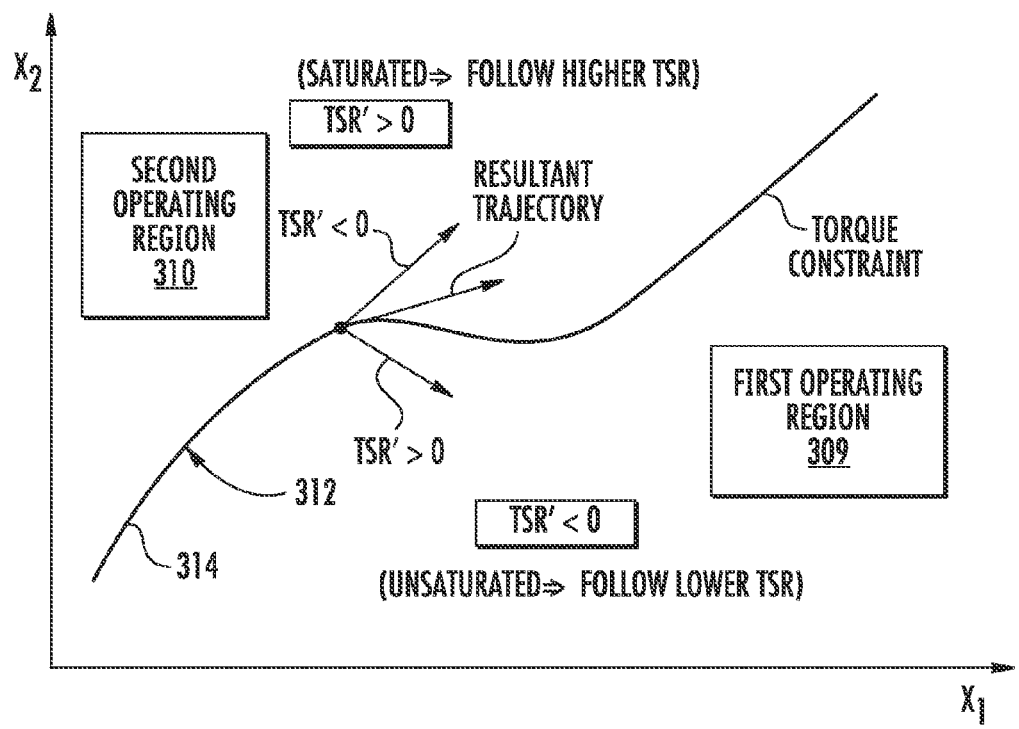
FIG. 7 illustrates a graph of one embodiment of torque (y-axis) versus TSR (x-axis) according to the present disclosure.

Referring now to FIG. 6, a flow diagram of one embodiment of a method 300 for improving power production of a wind turbine 10 is illustrated. As shown at 302, the method 300 includes defining a first operating region associated with an unsaturated torque range. At 304, the method 300 includes defining a second operating region associated with a saturated torque range. For example, as shown in FIG. 7, the unsaturated torque range of the first operating region 309 includes torque values less than a torque constraint boundary 312 of the wind turbine 10, whereas the saturated torque range of the second operation region 310 includes torque values equal to or greater than the torque constraint boundary 312 of the wind turbine 10. More specifically, the torque constraint boundary 312 of FIG. 7 illustrates a generic sliding mode surface (e.g. $s(x)=0$), wherein the axes are $x1$, $x2, \ldots xn$, where $x=[x1, x2, \ldots xn]$ is a vector. As such, the second operating region 310 includes x values for which the derivative of TSR, namely TSR', with respect to time is greater than zero (i.e. TSR'>0) and the first operating region 309 includes x values for which TSR' is less than zero (i.e. TSR'<0). In addition, the arrows along the torque constraint boundary 312 indicate the motion due to the chosen TSR', with the resultant trajectory 314 representing the actual motion achieved by switching TSR' values.

Figure 2:
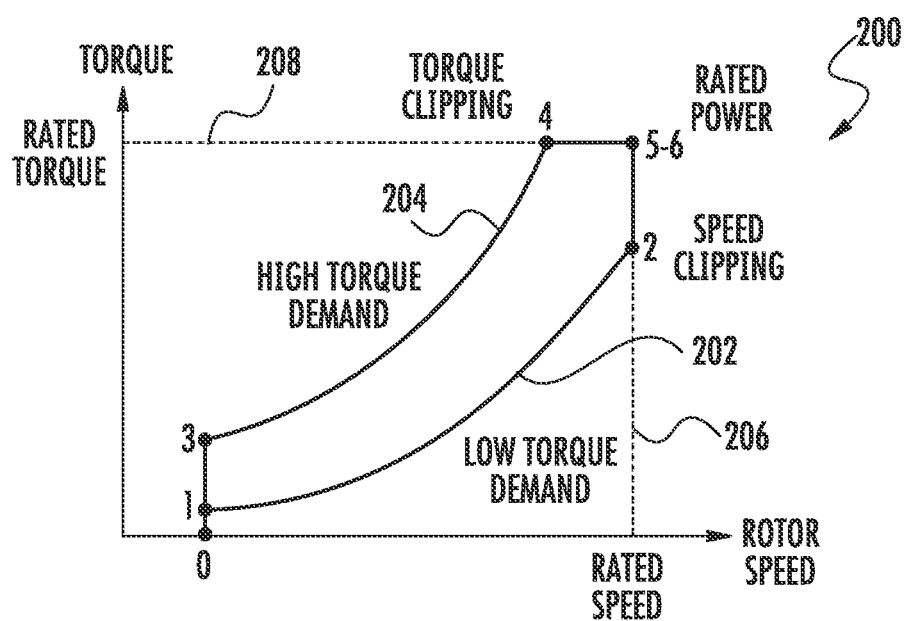
FIG. 2 illustrates torque-speed curves illustrating differing operating curves between low torque demand and high torque demand.

At 306, the method 300 includes monitoring a torque output of the wind turbine 10, e.g. via the one or more sensors 80, 82, 84, 86, 88. Further, at 308, the method 300 includes continuously adjusting a tip-speed-ratio set point of the wind turbine 10 so as to operate the wind turbine 10 along a torque constraint boundary 312 of the first and second operating regions 309, 310. More specifically, in certain embodiments, the method 300 may include increasing the tip-speed-ratio set point when the torque output of the wind turbine 10 is within the second operating region 310 (i.e. the torque is saturated) and decreasing the tip-speed-ratio set point when the torque output of the wind turbine 10 is within the first operating region 309 (i.e. the torque is unsaturated). For example, the torque constraint boundary 312 may be chosen based on when the wind turbine 10 begins pitching one or more of the rotor blades 22. In additional embodiments, the torque constraint boundary 312 may be determined by measuring torque and comparing it to a maximum torque limit. As used herein, the torque saturation point occurs when a torque output of the wind turbine 10 reaches a rated torque without any other conditions (e.g. point 4 of FIG. 2).

As such, in certain embodiments, the controller 26 is configured to operate the wind turbine 10 according to a lower TSR set point while the torque output is non-saturated. Similarly, while the torque output is saturated, the controller 26 is configured to use a higher TSR set point. For example, in certain embodiments, the controller 26 detects whether one or more blades needs to be moved to a feather position and then allows the generator speed of the wind turbine 10 to increase by increasing the TSR target, which increases the power set point. The controller 26 then maintains the blades 22 at fine pitch (instead of pitching as it would without the TSR increase). At this time, the controller 26 switches modes and decreases the TSR so as to reduce the power set point. The controller 26 again detects that one or more blades 22 need to be moved to feather and continues to operate in this manner by moving along or oscillating over the saturation/non-saturation torque constraint boundary 312.

Figure 8:
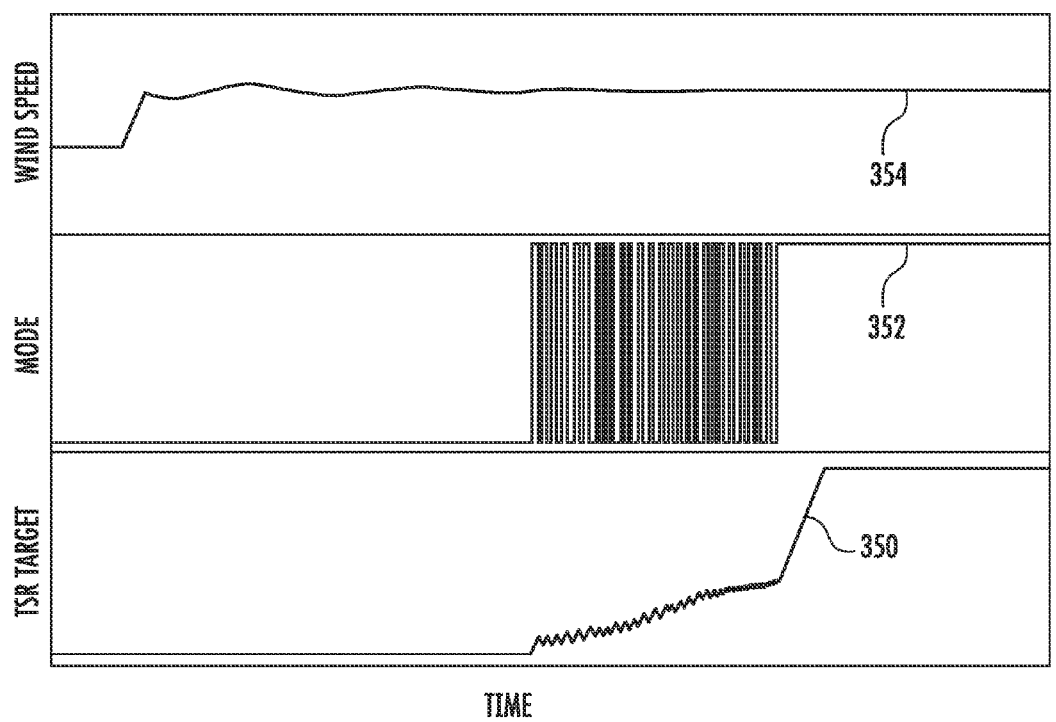
FIG. 8 illustrates multiple graphs of wind speed, mode, and TSR target versus time according to the present disclosure.

For example, as shown in FIG. 8, multiple graphs of one embodiment of wind speed, mode switching, and variable TSR target versus time, respectively, are illustrated. As shown, the graph illustrates when the wind turbine 10 is detecting saturation (i.e. when the controller 26 switches mode to a pitching mode and back to a fine-pitch mode). More specifically, line 350 illustrates the TSR target that the controller 26 is trying to achieve, particularly illustrating how the target goes up and down as the turbine 10 is saturated/de-saturated (i.e., switching modes). Further, line 352 illustrates the mode switching of the wind turbine 10 and line 354 illustrates the wind speed, which can be measured via one or more sensors or calculated via the controller 26.

In certain embodiments, if the wind turbine 10 is already operating at a maximum rotor or generator speed at torque saturation, an increase in the TSR will have little to no effect. In such embodiments, the controller 26 is configured to limit the increase in TSR as a function of maximum speed and maximum torque.

In additional embodiments, the controller 26 may determine the boundary 312 of the first and second operating regions 309, 310 based upon when the wind turbine 10 switches operating modes. For example, in certain embodiments, switching operating modes may be defined by pitching one or more rotor blades 22 of the wind turbine 10. As such, in certain embodiments, when the wind turbine 10 reaches the torque constraint boundary 312 and starts pitching, the controller 26 is configured to continually adjust the tip-speed-ratio set point whenever the mode changes.

As such, the controller 26 is configured to operate the wind turbine 10 by sliding along the saturated torque boundary 312. More specifically, in certain embodiments, the controller 26 is configured to operate the wind turbine 10 by utilizing sliding-mode control. As used herein, sliding mode control is a non-linear control method that alters the dynamics of the wind turbine system by application of a discontinuous control system that forces the system to slide along a cross-section of the system's normal behavior. As such, the controller 26 is configured to increase the TSR when the wind turbine 10 is operating above rated torque and decrease the TSR when the wind turbine 10 is operating below rated torque.

Figure 9:
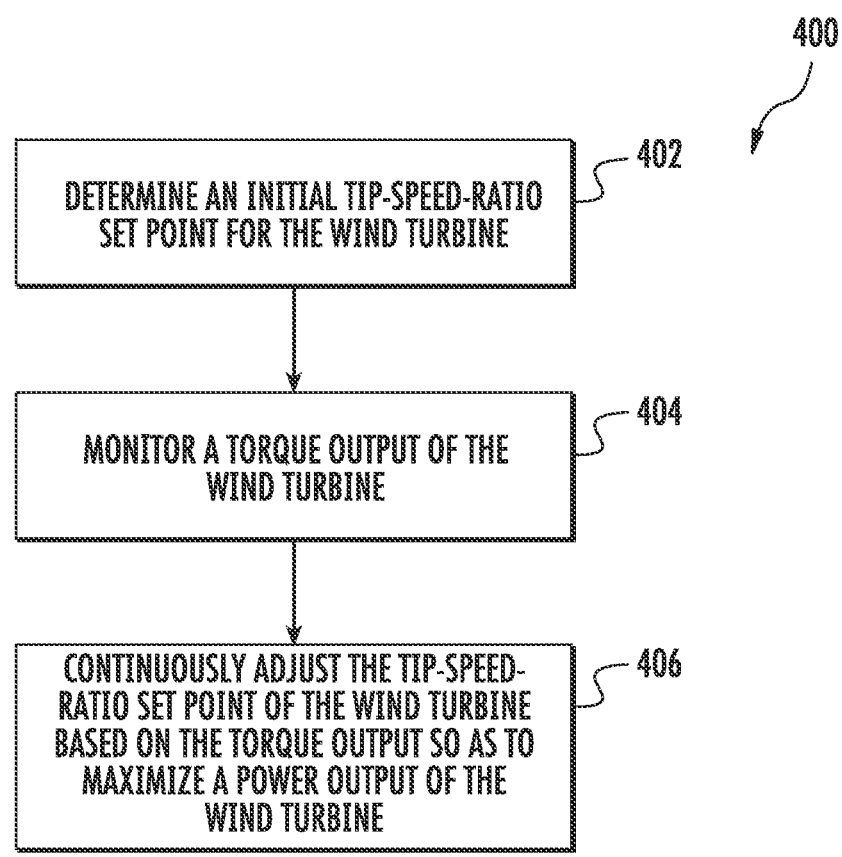
FIG. 9 illustrates a flow diagram of one embodiment of a method for operating a wind turbine based on a variable tip-speed-ratio according to the present disclosure.

Referring now to FIG. 9, a flow diagram of one embodiment of a method 400 for operating the wind turbine 10 based on a variable tip-speed-ratio is illustrated. As shown at 402, the method 400 includes determining, via the processor 60, an initial tip-speed-ratio set point for the wind turbine 10. At 404, the method 400 includes monitoring, via one or more sensors 80, 82, 84, 86, 88, a torque output of the wind turbine 10. At 406, the method 400 includes continuously adjusting the tip-speed-ratio set point of the wind turbine 10 based the torque output so as to maximize a power output of the wind turbine 10.

Figure 12:
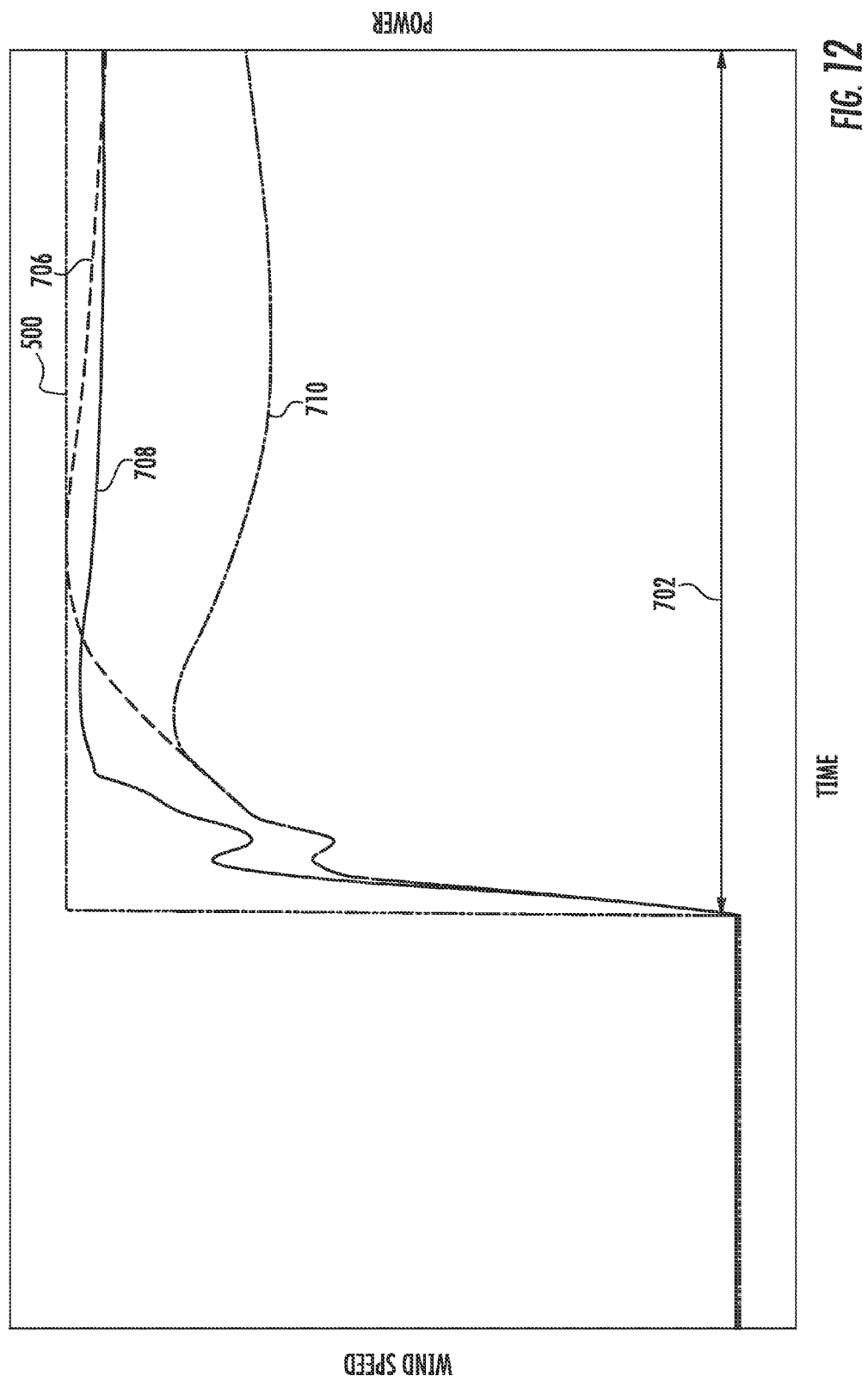
FIG. 12 illustrates a graph of wind speed and power versus time, particularly illustrating various benefits of operating the wind turbine with a variable TSR power level, according to the present disclosure.
Figure 13:
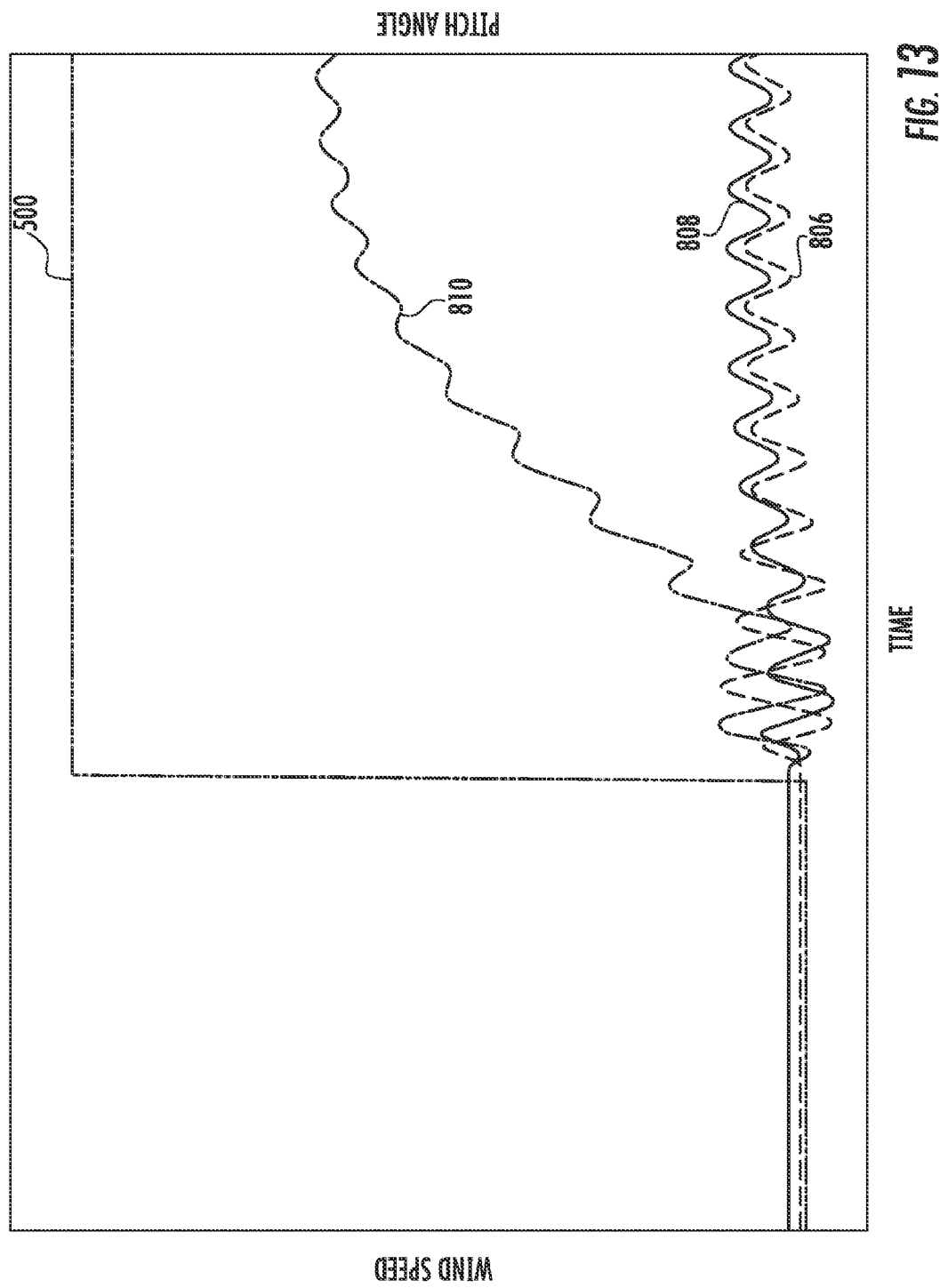
FIG. 13 illustrates a graph of wind speed and pitch angle versus time, particularly illustrating various benefits of operating the wind turbine with a variable TSR pitch angle, according to the present disclosure.
Figure 14:
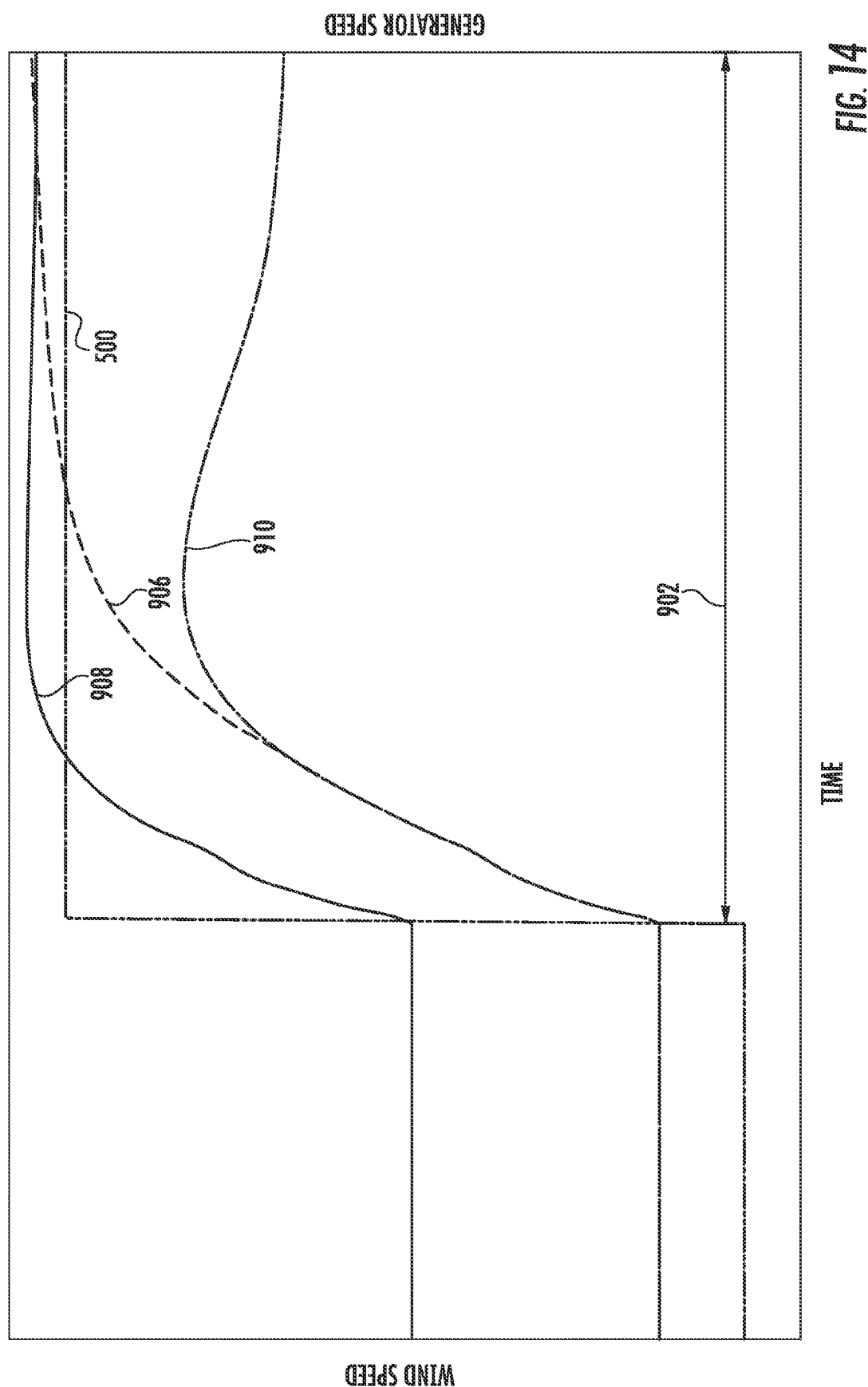
FIG. 14 illustrates a graph of wind speed and generator speed versus time, particularly illustrating various benefits of operating the wind turbine with a variable TSR generator speed, according to the present disclosure.

Referring now to FIGS. 10-14, various graphs illustrating advantages of operating the wind turbine based on variable TSR control according to the present disclosure are illustrated. More specifically, the graphs illustrate wind speed versus time plotted against a plurality of wind turbine operating conditions versus time, namely TSR (FIG. 10), torque output (FIG. 11), power output (FIG. 12), pitch angle (FIG. 13), and generator speed (FIG. 14). As shown generally in FIGS. 10-14, line 500 illustrates the wind speed for the wind turbine 10.

Figure 10:
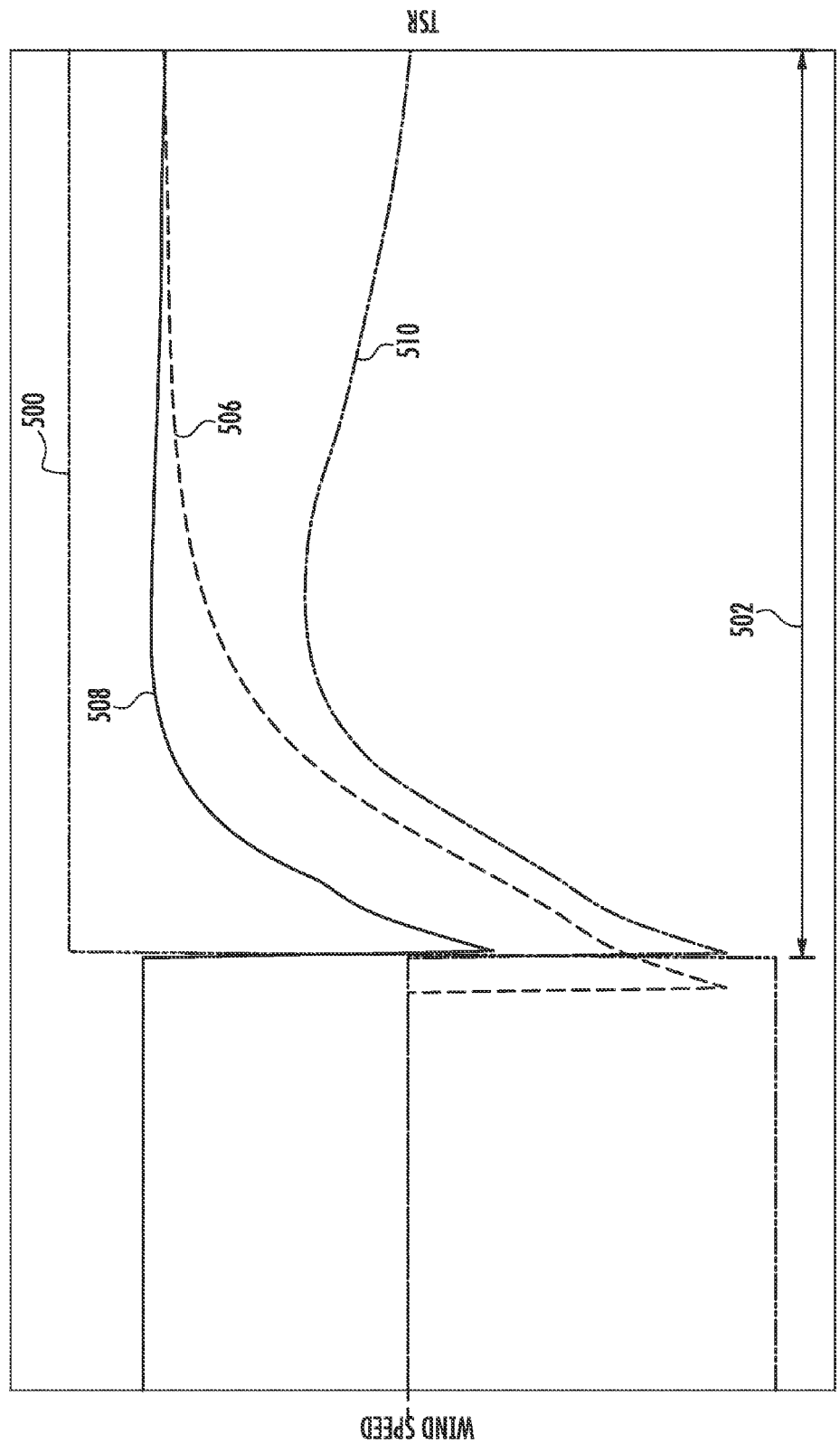
FIG. 10 illustrates a graph of wind speed and actual TSR versus time, particularly illustrating various benefits of operating the wind turbine with a variable TSR, according to the present disclosure.
Figure 11:
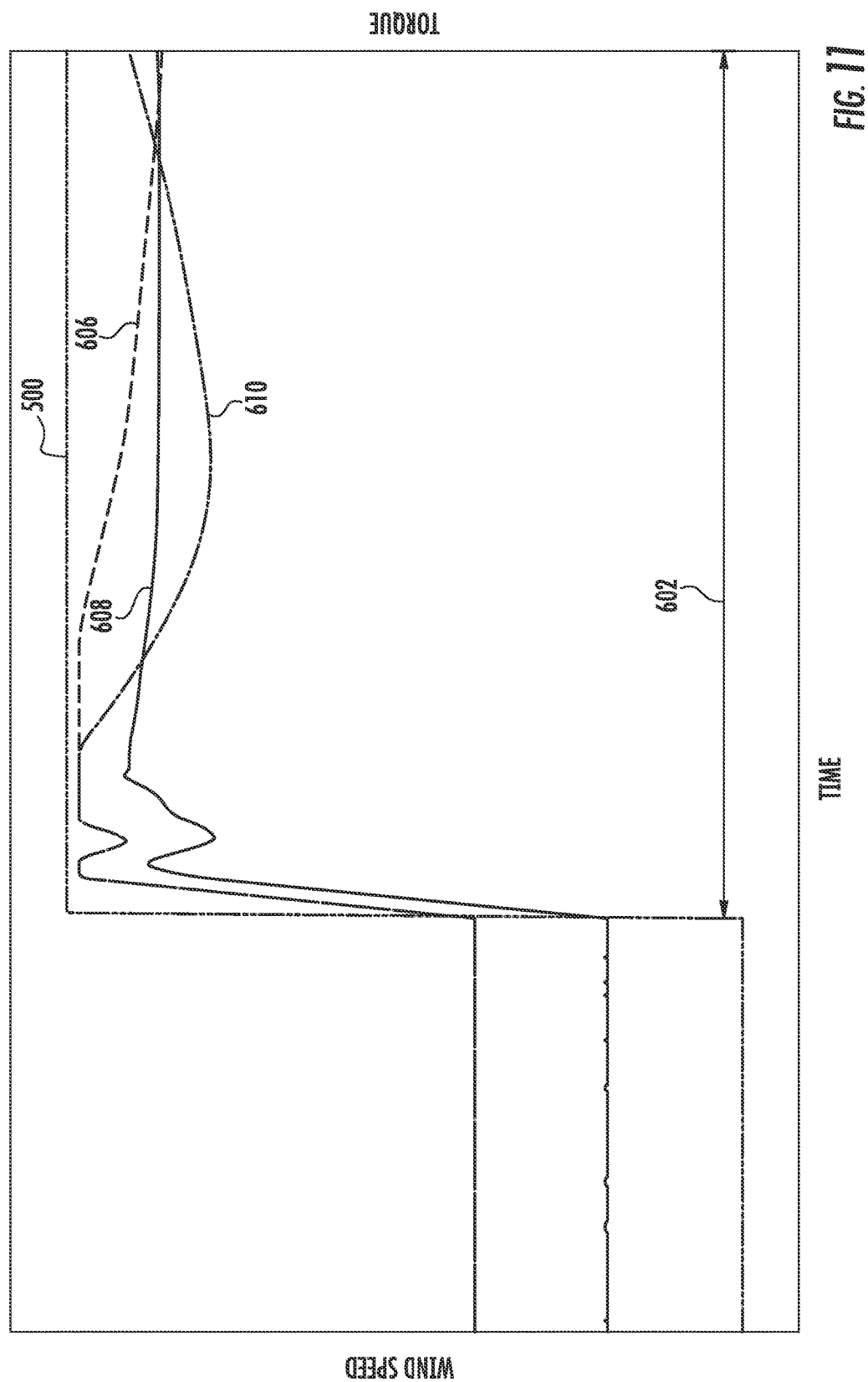
FIG. 11 illustrates a graph of wind speed and generator torque versus time, particularly illustrating various benefits of operating the wind turbine with a variable TSR torque value, according to the present disclosure.

More specifically, as shown in FIG. 10, for low wind speeds, the variable TSR 506 matches the lower TSR 510. Further, for high wind speeds, the variable TSR 506 matches the higher TSR 508 with a transition region 502 where the TSR increases (i.e. sliding) along the saturated torque boundary. As shown in FIG. 11, for lower wind speeds, the variable TSR torque value 606 matches the lower TSR torque value 610 (i.e. the torque saturates early). For high wind speeds, the variable TSR torque value 606 matches the higher TSR torque value 608 with a transition region 602 where the TSR torque value is increasing.

As shown in FIG. 12, for lower wind speeds, the variable TSR power level 706 matches both the lower TSR power level 710 and the higher TSR power level 708. For high wind speeds, however, the variable TSR power level 706 matches the higher TSR power level 708 with a transition region 702 where the TSR power level is increasing. Further, as shown for high wind speeds, the variable TSR power level is higher than the lower TSR power level 710. As such, by adjusting the TSR according to the present disclosure, power production is improved in the variable wind speed region of the power curve.

Referring to FIG. 13, for low wind speeds, the variable pitch angle 806 matches the lower and higher TSR pitch angles 808, 810 and all angles are at fine pitch. For high wind speeds, the lower TSR pitch angle 810 has a higher pitch angle which is what the present invention attempts to avoid. As such, the variable TSR pitch angle 806 matches the higher TSR pitch angle 808 during high wind speeds. As shown in FIG. 14, the variable TSR generator speed 906 is illustrated as compared to the lower TSR generator speed 910 and the higher TSR generator speed 908.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a wind turbine so as to increase power production, the method comprising:
    operating the wind turbine based on a fixed first tip speed ratio set point;

defining a first operating region associated with an unsaturated torque range;
defining a second operating region associated with a saturated torque range;
monitoring a torque output of the wind turbine; and,
actively changing the fixed first tip-speed-ratio set point of the wind turbine to a different, fixed second tip speed ratio set point when wind speed increases to a wind speed that is lower than rated speed at a lower than optimal tip speed ratio and the torque output reaches rated torque so as to operate the wind turbine along a torque constraint boundary of the first and second operating regions and to allow the wind turbine to reach the rated speed at a lower speed than the fixed first tip speed ratio set point is capable of achieving while maintaining the rated torque with increasing wind speed.

2. The method of claim 1, further comprising determining the torque constraint boundary of the first and second operating regions based upon when the wind turbine switches operating modes.

3. The method of claim 2, wherein switching operating modes further comprises pitching one or more rotor blades of the wind turbine.

4. The method of claim 3, wherein the saturated torque range occurs when the torque output of the wind turbine reaches a rated torque of the wind turbine.

5. The method of claim 1, further comprising continuously adjusting the fixed first tip speed ratio set point of the wind turbine in a variable wind speed region of a power curve of the wind turbine.

6. The method of claim 1, wherein the unsaturated torque range comprises torque values less than the torque constraint boundary of the wind turbine.

7. The method of claim 1, wherein the saturated torque range comprises torque values equal to or greater than the torque constraint boundary of the wind turbine.

8. The method of claim 1, further comprising filtering at least one of the fixed first and/or second tip speed ratio set points.

9. The method of claim 1, wherein actively changing the fixed first tip speed ratio set point of the wind turbine further comprises utilizing sliding-mode control.

10. A system for increasing power production of a wind turbine, the system comprising:
one or more sensors configured to monitor a torque output of the wind turbine during a first operating region associated with a saturated torque range and a second operating region associated with an unsaturated torque range;
a controller communicatively coupled to a processor, the processor configured to perform one or more operations, the operations comprising:
operating the wind turbine based on a fixed first tip speed ratio set point;
defining a first operating region associated with an unsaturated torque range;
defining a second operating region associated with a saturated torque range;
actively changing the fixed first tip-speed-ratio set point of the wind turbine to a different, fixed second tip speed ratio set point as wind speed increases to a wind speed that is lower than rated speed at a lower than optimal tip speed ratio and the torque output reaches rated torque so as to operate the wind turbine along a torque constraint boundary of the first and second operating regions and to allow the wind turbine to reach the rated speed at a lower speed than the fixed first tip speed ratio set point is capable of achieving while maintaining the rated torque with increasing wind speed.

11. The system of claim 10, wherein the one or more operations further comprise: determining the torque constraint boundary of the first and second operating regions based upon when the wind turbine switches operating modes.

12. The system of claim 11, wherein switching operating modes further comprises reaching a torque constraint of the wind turbine and pitching one or more rotor blades of the wind turbine.

13. The system of claim 12, wherein the unsaturated torque range comprises torque values less than the torque constraint boundary of the wind turbine, and the saturated torque range comprises torque values equal to or greater than the torque constraint boundary of the wind turbine.

14. The system of claim 10, wherein the one or more operations further comprise: filtering at least one of the fixed, first and/or second tip speed ratio set points.

\* \* \* \* \*